(12) United States Patent
Vogel et al.

(10) Patent No.: US 8,182,123 B2
(45) Date of Patent: May 22, 2012

(54) FLAT ILLUMINATION DEVICE FOR ILLUMINATION AND BACKLIGHTING WITH INTEGRATED EMERGENCY POWER SUPPLY

(75) Inventors: Carsten Vogel, Hamburg (DE); Detlef Heym, Achim (DE)

(73) Assignee: Airbus Operations GmbH (DE)

( * ) Notice: Subject to any disclaimer, the term of this patent is extended or adjusted under 35 U.S.C. 154(b) by 370 days.

(21) Appl. No.: 12/533,205

(22) Filed: Jul. 31, 2009

(65) Prior Publication Data

US 2010/0033980 A1 Feb. 11, 2010

Related U.S. Application Data

(60) Provisional application No. 61/137,971, filed on Aug. 5, 2008.

(30) Foreign Application Priority Data

Aug. 5, 2008 (DE) .......................... 10 2008 036 470

(51) Int. Cl.
*B64D 47/02* (2006.01)

(52) U.S. Cl. ........................ 362/471; 362/488; 362/97.1

(58) Field of Classification Search .................. 362/471, 362/488, 545, 97.1, 183, 231
See application file for complete search history.

(56) References Cited

U.S. PATENT DOCUMENTS

| 5,485,145 | A | 1/1996 | Sniff | |
|---|---|---|---|---|
| 7,048,422 | B1 | 5/2006 | Solomon | |
| 2004/0170015 | A1 | 9/2004 | Hamrick | |
| 2007/0069634 | A1* | 3/2007 | Carmon et al. | 313/504 |
| 2007/0211036 | A1* | 9/2007 | Perkins | 345/173 |
| 2008/0164981 | A1* | 7/2008 | Lin | 340/326 |
| 2009/0173377 | A1* | 7/2009 | Meininger et al. | 136/251 |
| 2009/0290743 | A1* | 11/2009 | Carroll | 381/385 |

FOREIGN PATENT DOCUMENTS

| DE | 4105547 A1 | 8/1992 |
|---|---|---|
| DE | 19908404 A1 | 9/2000 |
| DE | 10361982 A1 | 11/2005 |
| DE | 102006007285 A1 | 8/2007 |
| DE | 102006060781 A1 | 4/2008 |
| EP | 0072949 A1 | 3/1983 |
| WO | 2007093403 A1 | 8/2007 |

* cited by examiner

*Primary Examiner* — David V Bruce
(74) *Attorney, Agent, or Firm* — Lerner, David, Littenberg, Krumholz & Mentlik, LLP (57) ABSTRACT

The invention relates to a flat light-emitting lighting device for a vehicle, and to a method for providing emergency energy supply to the lighting device. A shallow installation depth and low power consumption of the lighting device may be ensured by the use of a flat OLED illumination device. Due to the low power consumption of the flat OLED illumination device, an emergency energy supply may be integrated without this increasing the installation depth. Such flat lighting devices, which in the case of emergency are self-supplying, may, for example, be used in aircraft in order to, with suitable icons or text, indicate escape routes or other emergency-relevant information.

15 Claims, 6 Drawing Sheets

FLAT ILLUMINATION DEVICE FOR ILLUMINATION AND BACKLIGHTING WITH INTEGRATED EMERGENCY POWER SUPPLY

CROSS-REFERENCE TO RELATED APPLICATIONS

This application claims the benefit of the filing date of U.S. Provisional Patent Application No. 61/137,971 filed Aug. 5, 2008, the disclosure of which is hereby incorporated herein by reference.

BACKGROUND OF THE INVENTION

The invention relates to lighting devices. In particular, the invention relates to a flat light-emitting lighting device for illumination and backlighting in vehicles, with integrated emergency power supply, to an aircraft, to the use, to a method, to a computer program element, and to a computer-readable storage medium.

Illuminated displays for signage, for example icons or written text, are often required in the field of passenger transport, in particular in the context of aircraft or ships. Illumination that is usually used for warning signs or information, e.g. emergency exit signs, is implemented either with conventional light bulbs or LEDs. These illumination techniques are associated with a disadvantage in particular in that considerable construction depth is required in order to achieve homogeneous illumination. For applications relating to the interior illumination in vehicles, for example in aviation, it will consequently be necessary for the designer of the interior cabin to make a decision on the type of illuminated display signs already at the planning phase, because corresponding recesses are to be provided in the interior lining.

From DE 199 08 404 A1 interior illumination for vehicles with several illumination means is known. LEDs are described as possible lighting means, which are point-shaped light sources and can appear as such. In order to generate homogeneous illumination, one embodiment of DE 199 08 404 A1 describes a grid-shaped arrangement of at least 30 LEDs and recommends that a space be maintained between the LEDs and the underside of a diffusing panel. One possible space from the diffusing panel approximately equates to the space among the individual light sources. In this way the arrangement of the interior illumination described in DE 199 08 404 A1 may require a relatively deep design depth.

Furthermore, in the case of lighting devices that use LED arrays as described in DE 199 08 404 A1 the use of several lighting means may result in high energy consumption proportional to the number of LEDs. A number of between, for example, 30 and 60 LEDs results in a power consumption of between 2 and 4 watts. In this way it may not be possible to use the benefit of the lower energy requirement of the individual LEDs to advantage.

From the European patent specification EP 0 072 949 B1 an illuminated warning- or display device is known that comprises a housing, a light-transmitting light screen and a light guiding body. The display device comprises several light sources, for example miniature lights with a comparatively high power consumption per lamp of approximately 2 W. Furthermore, the display comprises a multitude of individual parts, which may result in cost-intensive manufacture and in expensive installation work if changing the glass bulb lights becomes necessary. If an emergency situation arises it is of great importance that emergency-relevant display devices such as emergency exit displays continue to be illuminated. In this way the lighting device can be supplied with current even in the case of the cable system of a vehicle having sustained damage.

BRIEF SUMMARY OF THE INVENTION

Embodiments of the invention that are described below relate to the lighting device, the use, the method, a corresponding computer program element, and a computer-readable storage medium.

According to an exemplary embodiment of the invention, a flat light-emitting lighting device for a vehicle is provided with a panel light or any other flat illumination device, an emergency energy supply and a control device, wherein the control device is designed to monitor the emergency energy supply. Furthermore, the control device can be designed to control the emergency energy supply.

The lighting device according to the invention comprises a shallow design depth and an integrated emergency energy supply. In a failure, caused by an emergency, of the external principal energy supply the control device can switch on the emergency energy supply and for a certain time may ensure continued supply to the lighting device. This may also take place automatically in that the emergency energy supply comprises a capacitor circuit that automatically discharges when it is no longer being charged. With the use of accumulator batteries a corresponding charging circuit can be provided (depending on the type of the accumulator battery).

The control device monitors the charge state of the emergency energy supply either continuously or at predetermined intervals, and according to an exemplary embodiment of the invention is designed to emit an error signal or warning signal if the voltage of the emergency energy supply drops below a predetermined threshold value.

In the case of flat lighting devices according to the state of the art, no integrated emergency power supply may be described because in line with the high power consumption a high capacity of the energy storage device may be required.

According to a further exemplary embodiment of the invention, a flat illumination device is stated that comprises at least one first light-emitting OLED layer.

Organic light-emitting diodes (OLEDs) may have considerable application potential in the field of illumination technology, when compared to conventional light sources, OLEDs radiate as flat lit areas, with their distinguishing features being a larger angle of view, reduced current consumption, and furthermore the ability to be produced as very thin films or foils which may also be flexible. These flat layers can light up homogeneously and as a diffuse light source are particularly suited to applications in background illumination and display technology.

In this way a very low-profile and energy-efficient flat illumination device may be provided. The flat OLED illumination device according to the invention comprises, for example, one or several organic layers that have been applied very thinly to a substrate. Furthermore, even illumination without point-shaped radiation may be ensured by the application of OLEDs. In this way a very low-profile flat illumination device that at the same time is evenly lit can be implemented, which illumination device can be installed directly on a wall or panel. It is thus possible to do without expensive recesses in the wall or in the interior lining.

In OLED technology, glass is frequently used as a substrate in order to protect the OLED from humidity and oxidation processes. A glass surface can at the same time serve as a carrier face for icons and text that are, for example, printed or bonded. However, it may also be possible for the OLED surfaces to themselves display the desired icon, for example in that a directional arrow for emergency exits is represented by a triangular OLED surface. Furthermore, the lighting device can be used as dim light, night light or emergency light for use in emergency exits.

Due to the lower power consumption of OLEDS, of below 10% of conventional energy requirements, heat generation is very modest, and the capacity of a required emergency energy supply can be very low. Illumination, for example of an EXIT sign, only involves a power consumption of approximately 0.2 watts. In this way energy storage devices may be installed in a space-saving and weight-saving manner in the lighting device. Connection to an external emergency power supply, as is common for example in aircraft, thus becomes superfluous.

According to a further exemplary embodiment of the invention, the lighting device furthermore comprises a light-transmitting cover.

The light-transmitting cover can be a simple cover, a diffuser screen, a matt screen or a lens. With the use of robust materials with good surface hardness the lighting devices may also be used, among other things, as arrow-shaped markers in the floor, for example in order to mark the emergency exit in the case of a fire or a power failure.

According to a further exemplary embodiment of the invention, the light-transmitting cover is designed as a carrier face for signs such as icons or text in order to display information.

In other words the light-transmitting cover can be used as a carrier face for emergency signage, pictograms and text. Above all, there are a host of uses for information lights, warning lights and emergency exit lights in the field of civil aviation; however, these lights may also be suitable for general use, for example in hotels, factories or wherever public events or functions are held.

Symbols, such as numbers or letters, can be applied to the carrier face, for example by means of a film or foil. A fixed text, e.g. EXIT, can be printed on the carrier face or it can be applied with paint or a partly light-translucent material. Pictograms, icons or text can be displayed either as a positive image or a negative image, for example by punching out an icon.

According to a further exemplary embodiment of the invention, the lighting device further comprises a second OLED layer, wherein the first OLED layer is light-transmitting and designed to light in a selected colour, and by way of an overlay arrangement with the second OLED layer to make colour switching and/or colour mixing possible.

Depending on the polymer used for the OLED layer, the colour of the OLED is defined. In this way the colour design of the flat OLED illumination device may be determined depending on the application. For example in the case of illuminated marker arrows for emergency exits there is an option of defining additional meanings with the use of various colours of the arrow heads. Apart from white, for example the colours red, green or blue can be selected. Since the OLED material is transparent, with an overlay of two or more OLED colour layers it is thus possible, by additive colour mixing, for example to produce the colour yellow from green and red.

Suitable primary colours can, for example, be used for illuminated toilet signs. Green backlighting can be used to signify "unoccupied", while a switch to red can occur for the "occupied" phase. With simultaneous operation of both OLED layers it is, for example, possible by means of yellow backlighting to indicate to passengers the need to return to their seats.

According to a further exemplary embodiment of the invention, the emergency energy supply takes place by way of a chargeable energy storage device, which can be an accumulator battery or a capacitor.

As a result of the installation of chargeable energy storage devices, in emergency situations the energy supply to the emergency illumination equipment can continue to be ensured for a particular period of time. Due to the low power consumption of an OLED, accumulator batteries and/or capacitors of the smallest possible design size can be used (with relatively little energy storage). The use of energy storage devices obviates the need to connect an external battery-buffered emergency power supply system as commonly used in aircraft.

According to a further exemplary embodiment of the invention, the flat illumination device may also be operated by way of an external principal energy supply.

By way of the connection with an external principal energy supply the emergency energy supply, which is designed to comprise chargeable energy storage devices, can be charged in a simple manner. Furthermore, there is the option for the basic supply to the lighting device to run by way of the external principal energy supply. In this way the energy storage device that is integrated in the lighting device can be used in emergency situations only, thus in such an emergency situation ensuring an optimal fill level of the energy storage device.

According to a further exemplary embodiment of the invention, the control device is designed to monitor and control the energy storage device in that a fill level or charge state of the energy storage device is determined and when the fill level drops below a predetermined threshold value charging of the energy storage device by way of the external principal energy supply is initiated.

By means of the control device the fill level of the energy storage devices can be checked. If the voltage of the accumulator battery or of the capacitor falls below a particular threshold value, current for charging is supplied by the principal energy supply. The lighting device can be connected so that the flat OLED illumination device is always supplied by way of the energy storage device, and at the same time recharging takes place by way of the principal energy supply.

According to a further exemplary embodiment of the invention, the control device is designed to control the energy storage device in that the emergency energy supply is switched on as long as the external emergency energy supply is interrupted.

By way of the control device there is the option of switching the emergency energy supply on only if the principal energy supply is interrupted. Any power failure of the principal energy supply can, for example, be monitored by way of a control unit, for example a current measuring device. As soon as any termination of the external principal energy supply is detected, the control device automatically switches to the integrated emergency energy supply. This exemplary embodiment of the invention can also be important for a test procedure of the lighting device. These function tests need to be carried out regularly in the case of safety-relevant devices.

According to a further exemplary embodiment of the invention, the lighting device can be installed directly on a surface in an aircraft cabin, wherein the surface does not require any recesses and can be curved.

In particular in the field of aviation, flat, weight-saving luminous panels that may not require any recesses in the interior lining can be used for warning- or display devices. If the OLED layer or OLED layers is/are sandwiched between oxygen-impermeable polymer layers, the lighting device can be curved. As a result of the flexibility created in this way there is the option of affixing the lighting device on a multitude of surfaces. This is of great benefit in particular in the frequently encountered curved surfaces of interior cabins of aircraft.

According to an exemplary embodiment of the invention, an aircraft with an lighting device according to the invention is provided.

According to an exemplary embodiment the lighting device according to the invention is used in an aircraft. According to another exemplary embodiment the emergency energy supply is independent of the main electric power network of the aircraft.

According to a further exemplary embodiment of the invention, the method for providing an emergency energy supply to a low-profile light-emitting lighting device with a flat illumination device comprises monitoring an emergency energy supply.

Monitoring the emergency energy supply can take place in that the charge state of the energy storage devices of the emergency energy supply is acquired continuously or at regular intervals. Based on measuring information relating to the charge state it is possible both to emit a signal and to activate a charging circuit.

According to a further exemplary embodiment of the invention, a computer program element is provided which is designed, when executed by a processor, to carry out the method according to the invention.

According to a further exemplary embodiment of the invention, a computer-readable storage medium is stated, on which the computer program element according to the invention is stored.

Furthermore, it should be pointed out that the above characteristics or process-related steps can also be combined. Combination of the above characteristics or steps can also result in interactive effects that exceed the individual effect of the corresponding characteristics, even if this is not expressly described in detail.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

DETAILED DESCRIPTION

Figure 1:
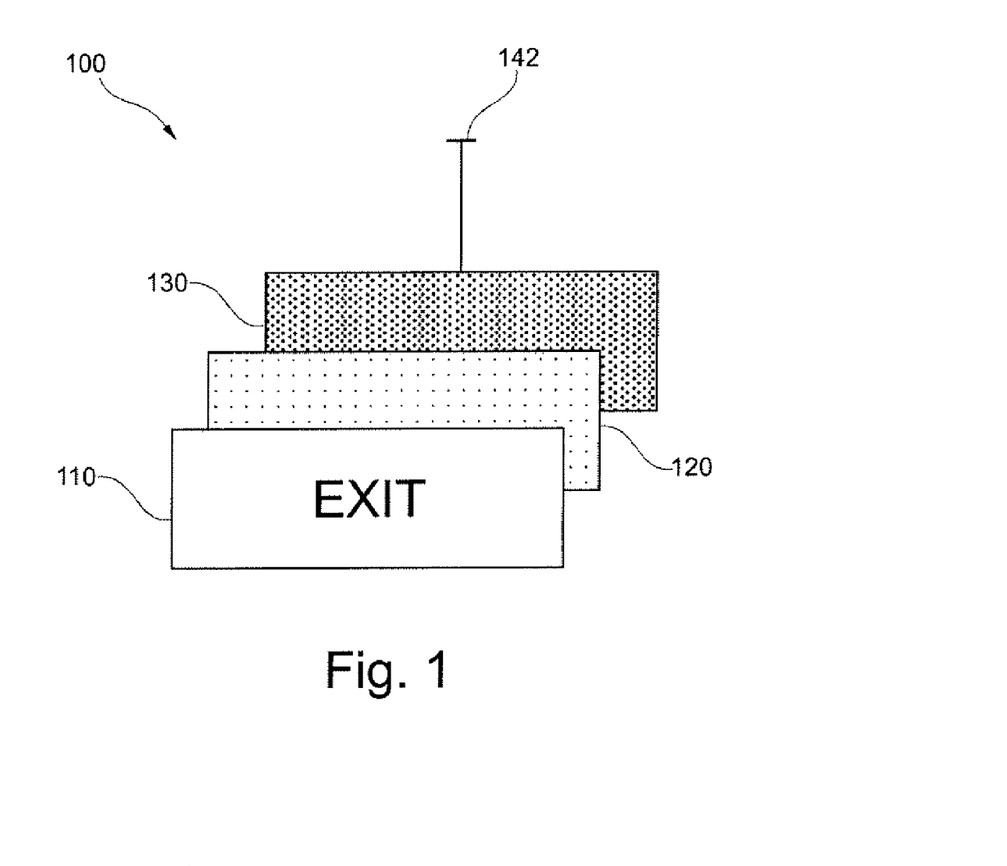
FIG. 1 shows a diagrammatic exploded view of a lighting device.

FIG. 1 shows a diagrammatic exploded view of a lighting device 100 according to an exemplary embodiment of the invention, comprising a carrier face 110, a flat illumination device 120 and an electronics unit 130 with an electrical supply line to the principal energy supply 142. The lighting device, which is shown as an example, is an illuminated information sign with the wording "EXIT" for marking the emergency exit, which signs are frequently used on board aircraft or ships. Emergency exits or escape routes can also be marked with the use of pictograms and additional information arrows. The carrier face 110 can, for example, be a film or foil that is bonded to the flat illumination device 120.

The flat illumination device 120 is, for example, a thin OLED lighting unit comprising one or several organic films or foils between each two electrodes. The electronics are diagrammatically indicated by the area 130; they are described in FIG. 4 with reference to an exemplary embodiment.

Figure 2:
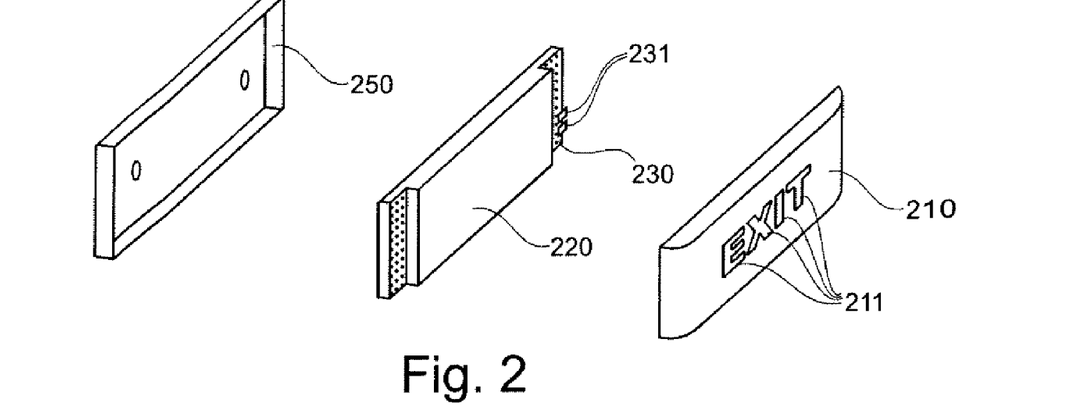
FIG. 2 shows an exploded view of a lighting device according to another exemplary embodiment of the invention.

As an example, FIG. 2 shows a further embodiment of the lighting device, comprising a diffuser light screen 210, on which "EXIT" 211 has been printed, an OLED luminous surface 220 with an electronics unit 230 and a housing 250 with holes for wall mounting. The electronics unit 230 comprises lateral contacts 231 to make it possible to connect it to the principal energy supply 142. In the electronics unit 230 the electronics components such as connections to the OLED electrodes, circuits and the integrated emergency energy supply, for example using a capacitor or an accumulator battery, can be housed. The circuits, for example a charge circuit, are shown as an example in FIG. 5.

Figure 3:
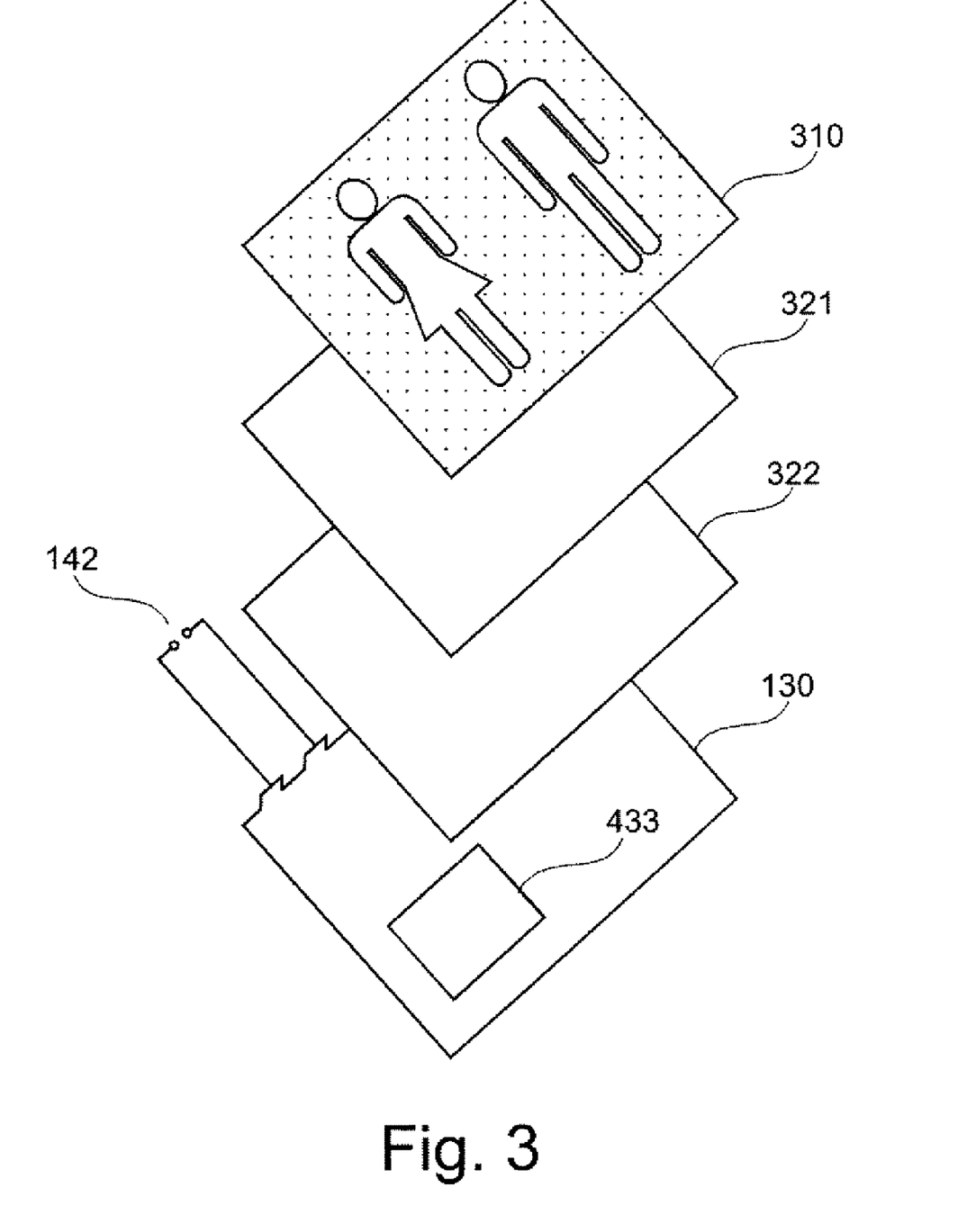
FIG. 3 shows a diagrammatic exploded view of a lighting device according to another exemplary embodiment of the invention.

FIG. 3 shows a diagrammatic exploded view of a further exemplary embodiment of the lighting device, comprising a carrier face 310 with a toilet icon, a first OLED layer 321 and a second OLED layer 322 that are connected to the electronics unit 130. The two OLED layers 321 and 322 can also be integrally shaped. For backlighting the toilet sign, the OLED layer 321 can, for example, be green, while the OLED layer 322 can be red. If the voltage is applied to the OLED layer 322 that is illuminated red, the light can continue to backlight the carrier face because the OLED layer 321 is light-transmitting, i.e. transparent. If a voltage is applied at the same time to both OLED layers 321 and 322, this results in yellow backlighting of the carrier face 310. This can indicate, for example in aircraft, that the toilets should no longer be used, and that passengers need to return to their seats.

Furthermore, the electronics unit 130 is connected to the principal energy supply 142. The electronics unit 130 can comprise further interfaces, for example to obtain information as to whether or not the toilet is occupied. This can, for example, take place by way of suitable contacts in the door or in the locking mechanism. A microprocessor 433 that is integrated in the electronics unit can acquire and process such information.

Figure 4:
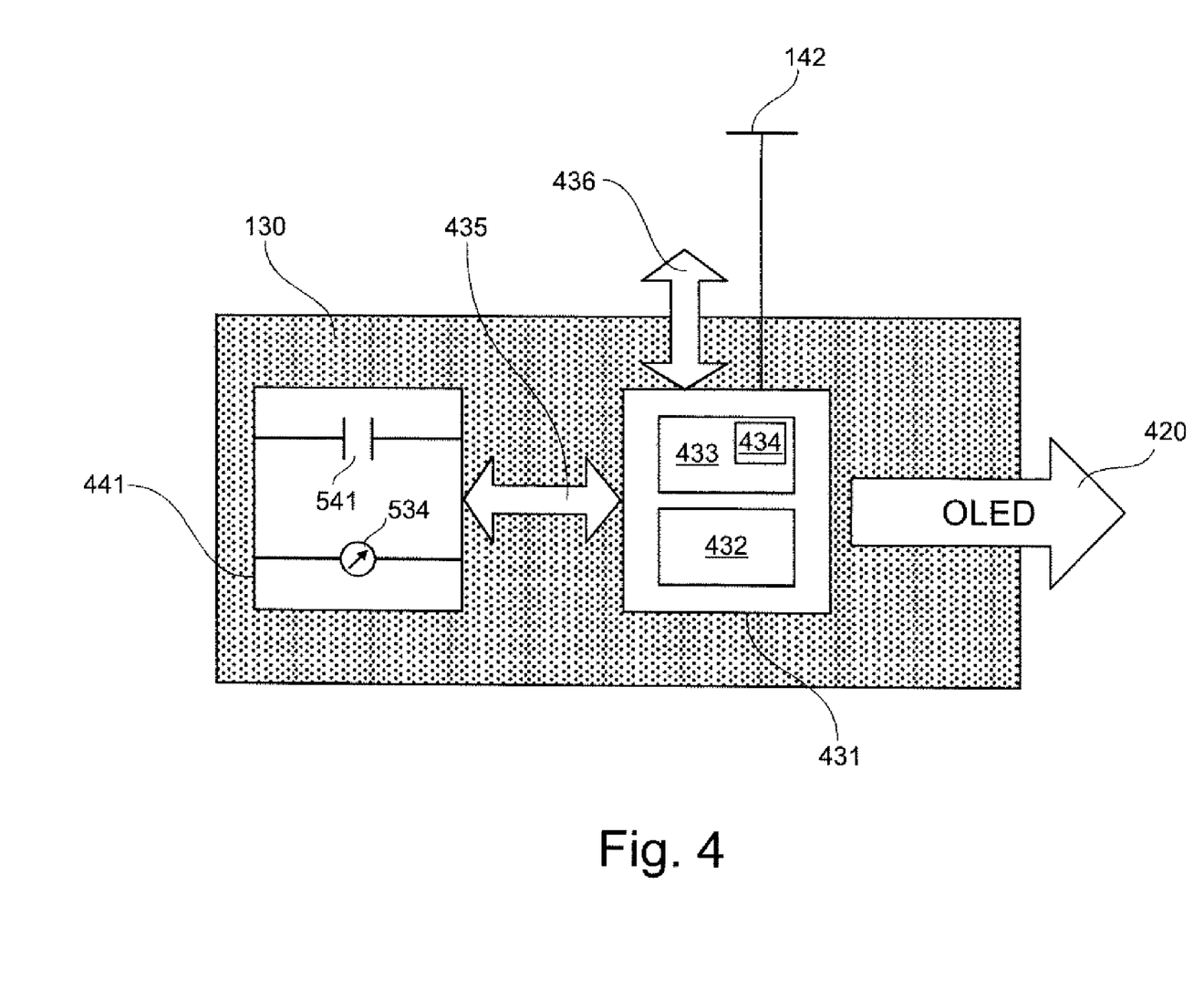
FIG. 4 shows a diagrammatic view of the electronics for explaining the emergency energy supply and the control device of the lighting device according to an exemplary embodiment of the invention.

FIG. 4 shows a diagrammatic view of the electronics unit 130. The electronics unit 130 comprises an emergency energy supply unit 441, a control device 431 and a processor 433 with a storage device 434. The "OLED arrow" 420 indicates that the OLED lighting unit can be controlled or switched on or off by way of the electronics unit. As an example of an emergency energy supply 441 a capacitor 541 is diagrammatically shown whose voltage or fill level is measured by means of a measuring device 534. The information relating to the fill level of the capacitor is forwarded to the control device 431 by way of an internal interface 435. In this location, depending on the fill level, the charging circuit 432 can be activated, and the current can be fed in by way of the interface 435. Charging takes place by way of the external power supply, i.e. by way of the principal energy supply 142 and by way of the external interface 436.

The control device 431 can receive information both internally by way of the internal interface 435, for example by a voltage meter 534 of the emergency energy supply, and externally by way of the external interface 436, for example if the signal is sent to the effect that "return to seat" information is to be displayed on the lighting device.

A storage device 434 can be read out by way of the external interface 436, for example in order to read out information that facilitates maintenance of the lighting device. For example, the information of the last fill level progression of the accumulator battery can be stored. If the accumulator battery discharges too quickly, a change in the accumulator battery may be recommended. In cases where the emergency energy supply is only used in emergencies, regular testing of the functionality of the accumulator battery or capacitor 541 can take place by way of the control device 431 and the processor 433. Regular function tests are, for example in aviation, prescribed in relation to safety-relevant equipment. By means of a storage device the data of a test can be stored and read out by way of the external interface 436. If a minimum duration of emergency energy supply of, for example, 30 minutes is not achieved, the control device 431 can generate a warning by means of blinking of the OLED surface by way of the OLED display 420 in order to initiate maintenance.

Figure 5A:
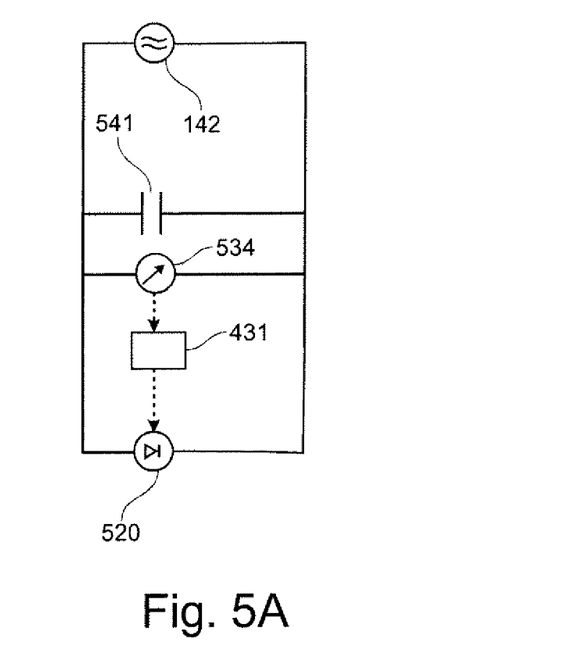
FIG. 5a and FIG. 5b show a circuit for operating and controlling a lighting device with an integrated emergency energy supply with reference to two exemplary embodiments of the invention.
Figure 5B:
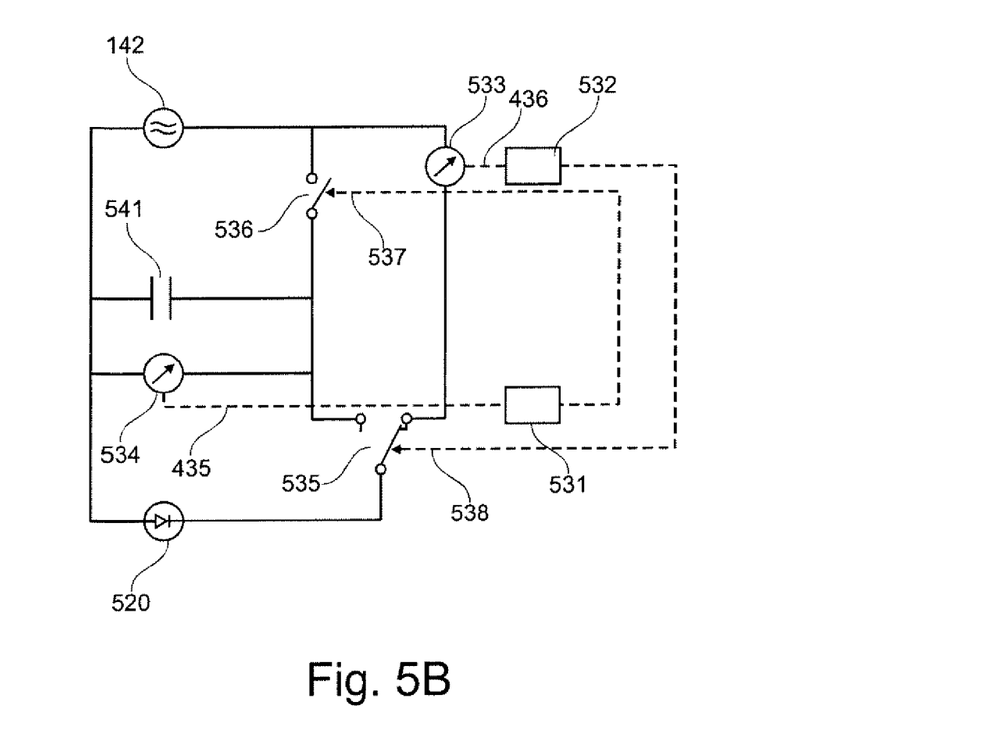

FIGS. 5a and 5b show two exemplary circuits for operating and controlling a lighting device with an integrated emergency energy supply. FIG. 5a shows a flat OLED illumination device 520, an emergency energy supply 541, a principal energy supply 142, a voltage meter 534 and a control device 431. The emergency energy supply 541 is designed as a capacitor. The capacitor 541 can automatically be loaded by a functional principal energy supply 142. In the case of failure of the principal energy supply 142, the capacitor automatically discharges and supplies the OLED lighting unit 541. The control device 431 acquires the measuring information of the voltage meter 534. In this way the voltage of the capacitor 541 can be monitored. For example, the control device 431 can be designed to emit a signal to the OLED lighting unit 520 when the measured actual value of the voltage is below a predetermined threshold value. For example, blinking of the OLED lighting unit or switching over to some other colour can be initiated as an error signal.

FIG. 5b shows a circuit comprising the OLED lighting unit 520, an emergency energy supply 541, a principal energy supply 142, measuring units 533 and 534 and switches 535 and 536 that are controlled by way of the control devices 531 and 532.

The emergency energy supply 541 is shown, as an example, as a capacitor whose voltage can be acquired by way of the voltage measuring device 534. The voltage measuring device 534 conveys measuring information relating to the capacitor voltage to the control unit 531 by way of the internal interface 435. If the voltage U drops below a predetermined threshold value $U_{DESIRED}$, the control unit 531 activates the charge circuit 537 and the switch 536 is closed.

Furthermore, FIG. 5 shows the option of feeding the flat illumination device 520 only from the emergency energy supply 541 if the current I at the current measuring device 533 falls below a predetermined threshold value $I_{DESIRED}$. In this way in the case of a power failure the control unit 532 can switch the switch 535 to the current circuit of the capacitor 541 by way of the control unit 538.

Figure 6:
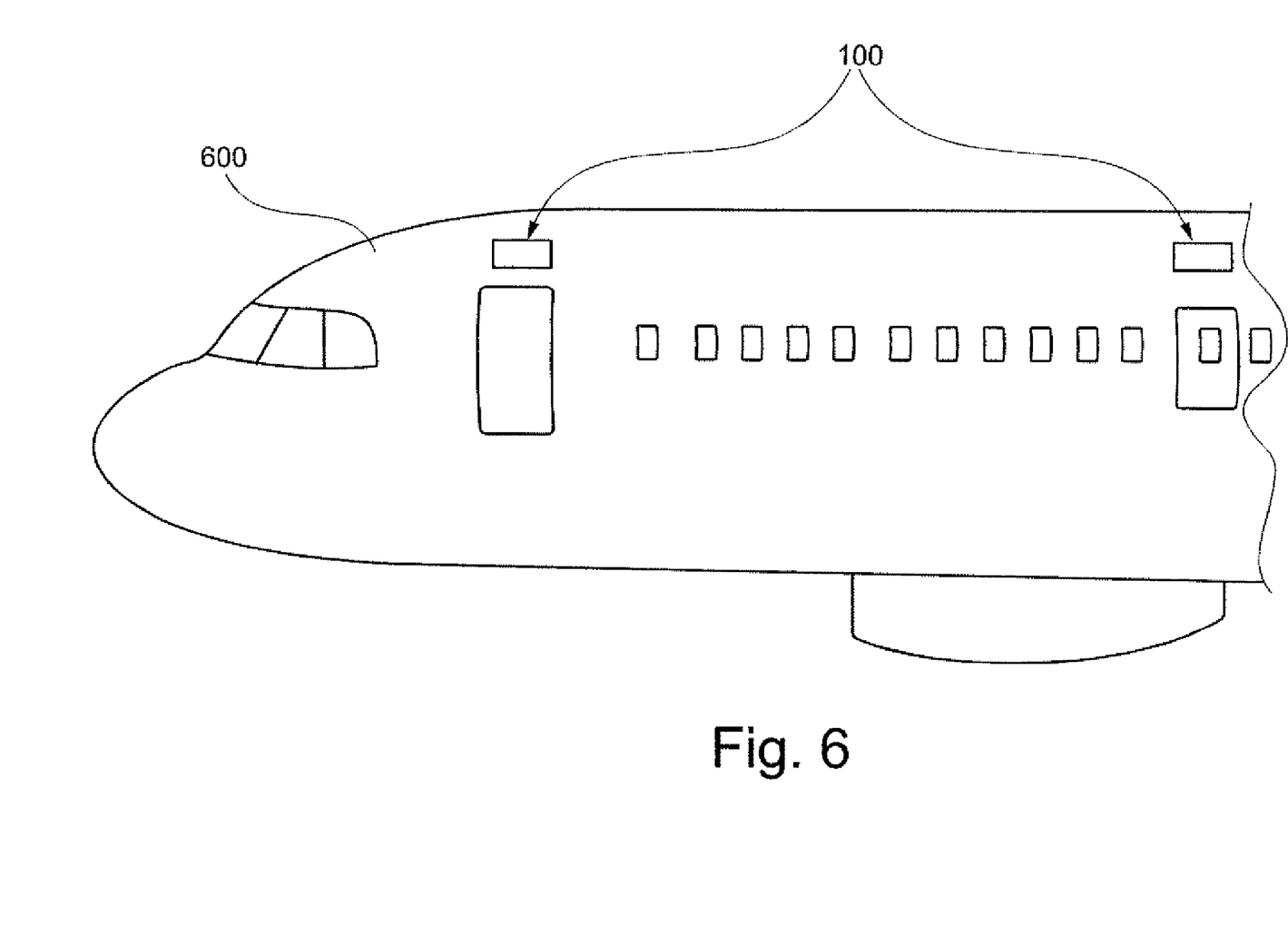
FIG. 6 shows an aircraft with a lighting device according to an exemplary embodiment of the invention.

FIG. 6 shows an aircraft 600 with lighting devices 100 that are arranged above the emergency exits. Further possible locations for the affixation of emergency information signs or markings in the form of arrows are, for example, the aisle or the sidewalls. As a result of the transparency of the OLED lighting unit, the affixation of lighting devices on the window panes is also possible, wherein the flat illumination device is, for example, only used in the dark, while being switched off in daylight.

Figure 7:
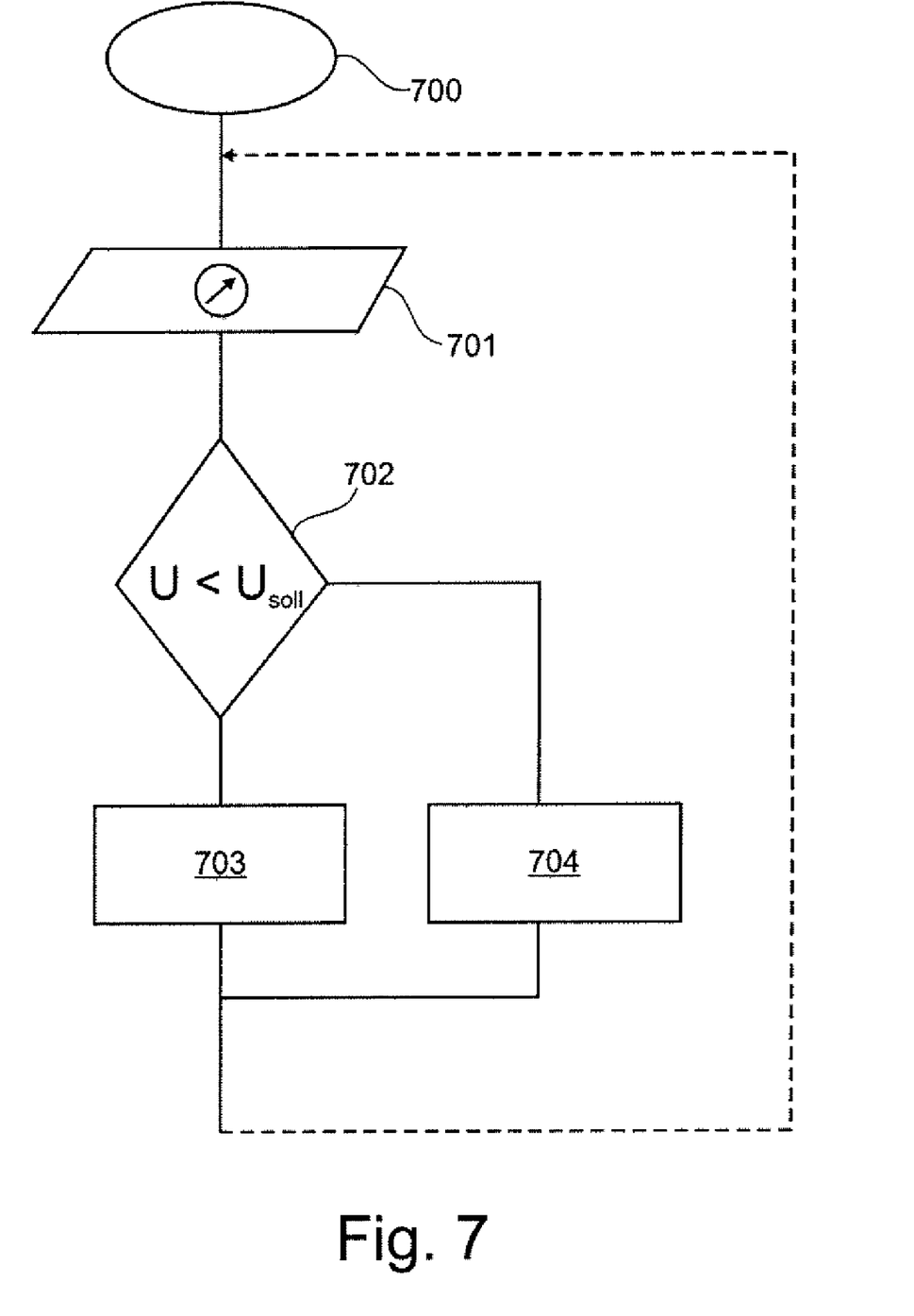
FIG. 7 shows a diagrammatic view of a method to supply emergency energy according to an exemplary embodiment of the invention.

FIG. 7 shows a method according to an exemplary embodiment of the invention for monitoring the emergency energy supply in that a fill level of the energy storage device is determined and if the fill level drops below a predetermined threshold value, changing of the energy storage device by way of the external principal energy supply is initiated. In step 700 the method for monitoring the fill level of the energy storage devices starts. In the second step 701, measuring information, for example the voltage U of the emergency energy supply, is acquired. After this, in step 702, the measured information (actual value) is compared with a predetermined threshold value $U_{DESIRED}$ in the control device. If the actual value exceeds the threshold value, for example in the case of full energy storage devices, the charge circuit is not activated by the control unit 703. If the actual value is below the threshold value, control is activated that causes charging of the energy storage device by way of the charge circuit (step 704). Monitoring the fill level of the energy storage devices is then initiated again in step 701, and step 704 is carried out until such time as the energy storage device is completely full.

According to a further exemplary embodiment of the invention, the flow chart described above can be applied to a further monitoring function of the emergency energy supply in order to indicate a fault. Here again, in step 701 the voltage information of the emergency energy supply is acquired, and in step 702 the actual value is compared to a predetermined threshold value $U_{DESIRED}$. In the case of a failure to reach a predetermined threshold value $U_{DESIRED}$, a signal is emitted (step 704). If the actual value exceeds $U_{DESIRED}$, signal emission is blocked (step 703). This can, for example, be an error signal that by means of blinking of the OLED lighting unit warns that maintenance is required.

Furthermore, the same flow chart may be applicable in the case of controlling the emergency energy supply, wherein the emergency energy supply is switched on as long as the external emergency energy supply falls below a predetermined threshold value. In this process either the voltage or the current of the principal energy supply is measured and acquired as information in step 701. For example, if there has been a failure in the supply of current, in process step 702 it is detected that the voltage U is zero, i.e. is below the desired value $U_{DESIRED}$. After this, control of the process-related step 704 is initiated, i.e. the circuit is switched to the internal emergency energy supply. If in the query in step 703 the desired value is met, the control unit in step 703 causes the switch to be set to the external principal energy supply.

The invention claimed is:
1. A flat light-emitting lighting device for a vehicle, wherein the lighting device comprises:
   a flat illumination device;
   an emergency energy supply; and
   a control device configured to monitor the emergency energy supply, wherein the control device comprises an external interface configured for receiving external information and for reading out information for carrying out a test of the lighting device.

2. The lighting device of claim 1, wherein the flat illumination device comprises at least one first light-emitting OLED layer.

3. The lighting device of claim 1, further comprising a light-transmitting cover.

4. The lighting device of claim 3, wherein the light-transmitting cover is configured as a carrier face for signage comprising at least one of icons and text to display information.

5. The lighting device of claim 1, wherein the emergency energy supply is by way of a chargeable energy storage device which is selected from the group consisting of:
   an accumulator battery; and
   a capacitor.

6. The lighting device of claim 1, wherein the flat illumination device can be operated by way of an external principal energy supply.

7. The lighting device of claim 5, wherein the control device monitors and controls the energy storage device in that a fill level of the energy storage device is determined and when the fill level drops below a predetermined threshold value, charging of the energy storage device by way of an external principal energy supply is initiated.

8. The lighting device of claim 5, wherein the control device monitors and controls the energy storage device in that the emergency energy supply is switched on as long as an external emergency energy supply is interrupted.

9. The lighting device of claim 1, wherein the emergency energy supply is independent of the main electric power network of the aircraft.

10. A method for providing an emergency energy supply to a flat light-emitting lighting device comprising a flat illumination device, wherein the method comprises:
   monitoring an emergency energy supply for the lighting device, and
   receiving and sending external information for carrying out a test of the lighting device.

11. A computer program element configured, when executed by a processor, to carry out a method for providing an emergency energy supply to a flat light-emitting lighting device comprising a flat illumination device, said method comprising the steps of:
   monitoring an emergency energy supply for the lighting device; and
   receiving and sending external information for carrying out a test of the lighting device.

12. A computer-readable storage medium, on which a computer program element, said computer program element, when executed by a processor, being configured to carry out a method for providing an emergency energy supply to a flat a light-emitting lighting device comprising a flat illumination device, said method comprising the steps of:
   monitoring an emergency energy supply for the lighting device; and
   receiving and sending external information for carrying out a test of the lighting device.

13. A flat light-emitting lighting device for a vehicle, wherein the lighting device comprises:
   a flat illumination device;
   an emergency energy supply;
   a control device configured to monitor the emergency energy supply;
   a first transparent light-emitting OLED layer; and
   a second OLED layer,
   wherein the first light-emitting OLED layer is configured to light in a selected colour, and by way of an overlay arrangement with the second OLED layer, to make at least one of colour switching and colour mixing possible.

14. A flat light-emitting lighting device for a vehicle for direct installation on a surface of an aircraft cabin, wherein the lighting device comprises:
   a flat illumination device;
   an emergency energy supply; and
   a control device configured to monitor the emergency energy supply, wherein the surface does not require any recesses and can be curved.

15. An aircraft comprising a flat light-emitting lighting device, said lighting device comprising:
   a flat illumination device;
   an emergency energy supply; and
   a control device configured to monitor the emergency energy supply,
   wherein the control device comprises an external interface configured for receiving external information and for reading out information for carrying out a test of the lighting device.

* * * * *